United States Patent
Casas et al.

(10) Patent No.: US 8,170,128 B2
(45) Date of Patent: May 1, 2012

(54) METHOD AND APPARATUS FOR JOINT DECODING AND EQUALIZATION

(75) Inventors: Raul Alejandro Casas, Doylestown, PA (US); Stephen Leonard Biracree, Rochester, NY (US); Slobodan Simovich, San Francisco, CA (US); Thomas Joseph Endres, Seattle, WA (US)

(73) Assignee: Iberium Communications, Inc., San Francisco, CA (US)

( * ) Notice: Subject to any disclaimer, the term of this patent is extended or adjusted under 35 U.S.C. 154(b) by 881 days.

(21) Appl. No.: 12/229,725

(22) Filed: Aug. 26, 2008

(65) Prior Publication Data

US 2009/0067486 A1 Mar. 12, 2009

Related U.S. Application Data

(60) Provisional application No. 60/967,515, filed on Sep. 5, 2007.

(51) Int. Cl.
*H04L 5/12* (2006.01)
*H04L 23/02* (2006.01)
(52) U.S. Cl. ........................................ 375/265; 375/346
(58) Field of Classification Search .......... 375/229–236, 375/265, 316, 341
See application file for complete search history.

(56) References Cited

U.S. PATENT DOCUMENTS

| | | | |
|---|---|---|---|
| 7,613,238 B2 * | 11/2009 | Chang | 375/233 |
| 7,697,642 B2 * | 4/2010 | Kim | 375/341 |
| 2004/0128610 A1 * | 7/2004 | Wei | 714/792 |

* cited by examiner

*Primary Examiner* — Chieh M Fan
*Assistant Examiner* — Freshteh N Aghdam
(74) *Attorney, Agent, or Firm* — Olympic Patent Works PLLC

(57) ABSTRACT

The present invention is related to joint trellis decoding and equalization using a decision feedback equalizer.

1 Claim, 13 Drawing Sheets

METHOD AND APPARATUS FOR JOINT DECODING AND EQUALIZATION

CROSS REFERENCE TO RELATED APPLICATION

This application claims the benefit of Provisional Application No. 60/967,515, filed Sep. 5, 2007.

FIELD OF INVENTION

The present invention is related to joint trellis decoding and equalization using a decision feedback equalizer.

BACKGROUND OF INVENTION

Equalization in a digital receiver is a process whereby multipath, noise, and other interferences incurred in the digital broadcast are removed from the received signal, attempting to restore the original digital transmission. Since the characteristics of the broadcast channel are rarely known a priori to the receiver, and can change dynamically, equalizers are usually implemented using adaptive filters.

Most state-of-the-art digital receivers use some type of decision feedback equalizer (DFE), because it provides superior inter-symbol interference (ISI) cancellation with less noise gain than a Finite Impulse Response (FIR)-only equalizer structure. Austin first proposed a DFE, in a report entitled "Decision feedback equalization for digital communication over dispersive channels," *MIT Lincoln Labs Technical Report No.* 437, Lexington, Mass., August 1967. A DFE acts to additively cancel ISI by subtracting filtered symbol estimates from the received waveform.

Nearly all modem digital communication systems use some type of channel coding at the transmitter, and complementary decoding at the receiver. Channel coding typically induces some type of redundancy or overhead in the signal, at the expense of reduced bandwidth, with the benefit of better estimation of the transmitted signal. A common type of channel coding uses trellis coded modulation techniques; see, for example, chapter 3 of Trellis Coding, C. Schlegel, *IEEE Press*, NY, 1997.

Some prior art techniques combine equalization and decoding to provide better overall recovered signal error rates. For example, in "Delayed-decision feedback sequence estimation," by A. Duel-Hallen and C. Heegard, in *IEEE Transactions on Communications*, vol. 37, no. 5, May 1989, a tunable detection algorithm is introduced for a contiguous block of symbols, where the length of the block is tunable, and the algorithm uses a reduced-state search which incorporates information from the feedback filter to calculate path metrics. The information and symbol estimates are constrained to be contiguous.

In "Reduced-state sequence estimation with set partitioning and decision feedback," by M. Eyuboglu and S. Qureshi, in *IEEE Transactions on Communications*, vol. 36, no. 1, January 1988, a conventional viterbi algorithm is used to search a reduced-state trellis, constructed using set partitioning, so that the complexity of the maximum likelihood approach is reduced, with little loss of performance.

In "Block decision feedback equalization," by D. Williamson et al., in *IEEE Transactions on Communications*, vol. 40, no. 2, February 1992, a generalization of the DFE is presented where a contiguous block of data is used to estimate a contiguous block of symbols. The algorithm is tunable in the block-length of data used, and the block-length of symbols estimated, and is shown to be a generalization of the maximum likelihood sequence estimator and the maximum symbol-by-symbol a posteriori detector.

In "Decision feedback equalization with trellis decoding," by R. Gitlin and N. Zervos, in U.S. Pat. No. 5,056,117, Oct. 8, 1991, a trellis decoder is used to provide tentative decisions derived from survival paths of the Viterbi algorithm to the feedback filter in the DFE so as to minimize feedback errors.

All of the aforementioned publications are hereby incorporated by reference.

The present invention uses joint trellis decoding and decision feedback equalization to efficiently estimate non-contiguous symbols using equalizer outputs that are also not contiguous. The estimation process uses all new possibilities of symbol values, instead of old decision feedback symbol estimates.

SUMMARY OF INVENTION

The present invention is related to joint trellis decoding and equalization using a decision feedback equalizer.

BRIEF DESCRIPTION OF DRAWINGS

Other aspects, features, and advantages of the present invention will become more fully apparent from the following detailed description, the appended claims, and the accompanying drawings and tables in which:

DETAILED DESCRIPTION

Figure 1:
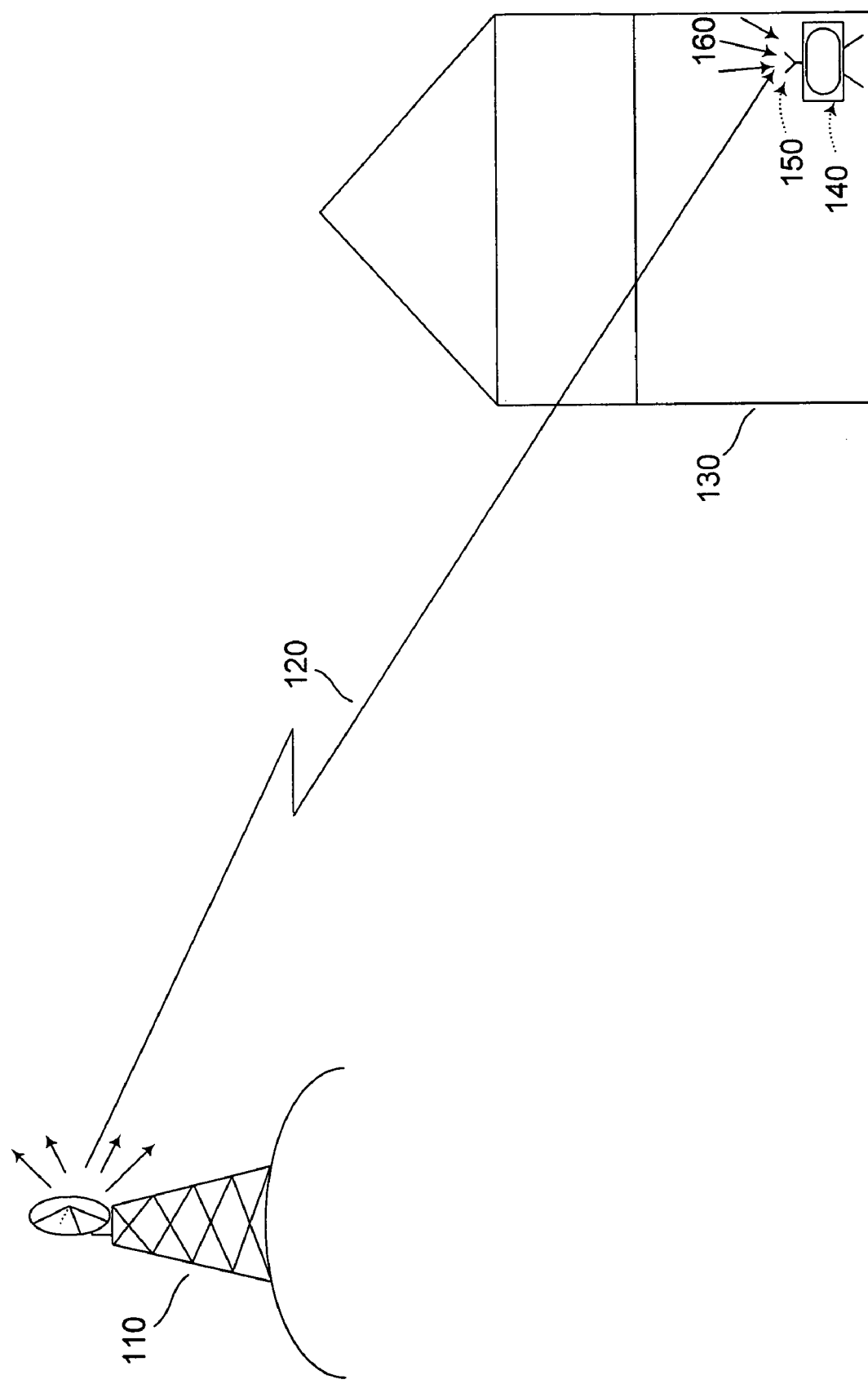
FIG. 1 shows a typical prior art digital television broadcast communication system.

FIG. 1 depicts a typical prior art digital television broadcast communication system, used as an exemplary communication system for which the present invention is applicable. Transmitter station 110 broadcasts Digital Television (DTV) signal 120, which radiates through house 130 to antenna 150. The induced penetration loss of the RF carrie's signal power through house 130 can be significant, easily 20 dB. Antenna 150 is usually in close proximity to television 140, or can be remotely connected to television 140. Antenna 150 also receives multipath signals, collectively 160, which can be caused by reflections from other buildings, or items interior to house 130, such as walls, furniture, persons, etc. Furthermore, in most viewing environments, the television 140 is located in a communal part of house 130, so that reflections from moving persons, etc. induce time varying multipath signals 160. Any reflections from moving cars or airplanes cause further time variations in multipath signals 160.

Figure 2:
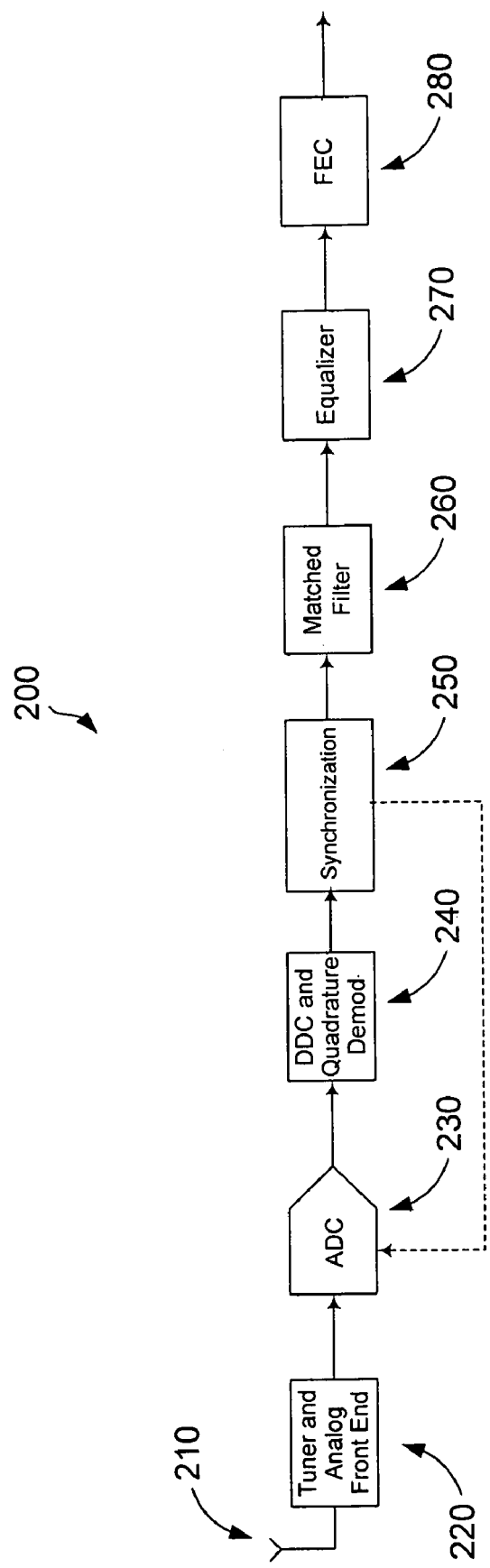
FIG. 2 shows a typical prior art digital receiver system.

FIG. 2 shows a typical prior art digital receiver system 200. Antenna 210 receives DTV broadcast signal 120, and is coupled to Tuner and Analog Front End module 220. Tuner and Analog Front End module 220 tunes to the proper broadcast channel, performs level setting, synchronization, and filtering, and couples the signal to ADC 230. ADC 230 digitizes the analog signal, typically 10-12 bits for DTV, and supplies the bit stream to DDC and Quadrature Demodulation module 240. DDC and quadrature demodulation module 240 performs direct digital downconversion (DDC) and in-phase/quadrature-phase split into complex near-baseband. In addition, other filtering may be used, for example, rejection of adjacent broadcasts. The near-baseband signal from DDC and quadrature demodulation module 240 is coupled to synchronization module 250. Synchronization module 250 aligns the sample rate and phase of the received samples to the transmitted data samples, by known methods, typically either interpolating the data or adjusting the sample clock of ADC 230, shown in phantom. Furthermore, carrier phase and frequency recovery may be done using the pilot tone that is embedded into the DTV data spectrum, using known methods. Timed data from synchronization module 250 is supplied to matched filter 260, which usually performs square-root raised cosine filtering that is matched to the pulse shape filter applied at the transmitter 110. The output of matched filter 260 is supplied to Equalizer 270, which performs adaptive equalization to mitigate inter-symbol interference incurred in the broadcast channel. Furthermore, equalizer 270 may include a fine carrier recovery loop, translating the data to precise baseband. Equalizer 270 provides an equalized signal to FEC 280, which performs forward error correction to minimize the received bit error rate and provides the recovered digital video signal, usually as MPEG packets, which can be decoded and viewed on a television. The present invention pertains to the equalizer 270 in the digital receiver.

Figure 3:
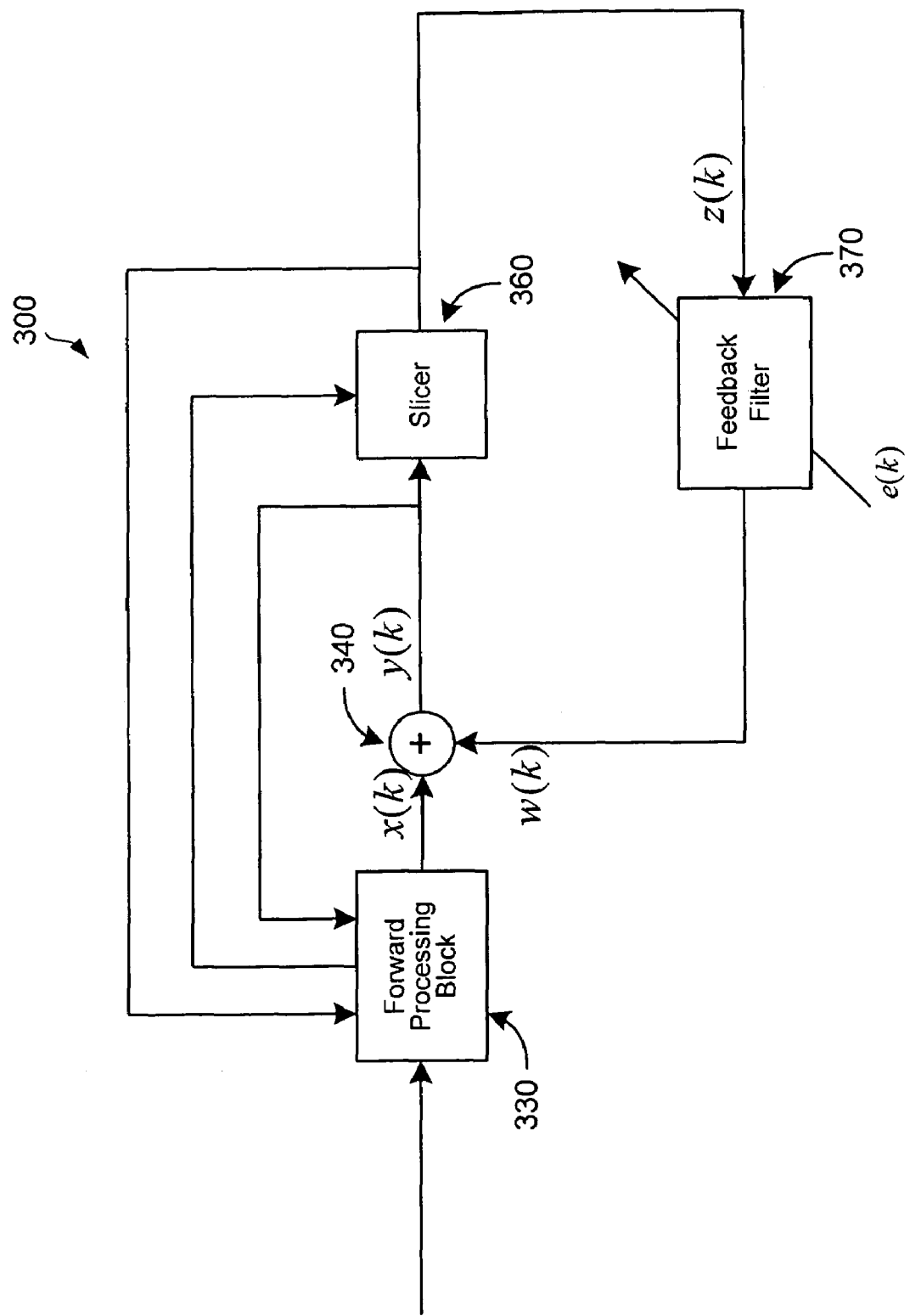
FIG. 3 shows a prior art decision feedback equalizer.

FIG. 3 depicts a block diagram of a prior art equalizer and encapsulates the equalizer architectures described in "Feasibility of reliable 8-VSB reception" by C. H. Strolle et al, *Proceedings of the NAB Broadcast Engineering Conference,"* Las Vegas, Nev., pp. 483-488, April 8-13, 2000, among other prior art equalizer architectures. The equalizer in FIG. 3 is suitable for Vestigial Sideband (VSB) signals, for example, in accordance with the ATSC DTV broadcast standard. The equalizer in FIG. 3 is also suitable for QAM signals, encapsulating the equalizer architecture described in "Carrier independent blind initialization of a DFE," by T. J. Endres et al., in *Proceedings of the IEEE Workshop on Signal Processing Advances in Wireless Communications*, Annapolis, Md., May 1999. One skilled in the art would know how to use the equalizer architecture described in FIG. 3 for a variety of signal formats commonly used in digital communication systems.

Forward processing block 330 encompasses multiple prior art signal processing functions, and may include circuitry for adaptive forward filtering, carrier recovery, error term generation, et al., for example. See "Phase detector in a carrier recovery network for a vestigial sideband signal," U.S. Pat. No. 5,706,057 issued Jan. 6, 1998, by C. H. Strolle et al., for carrier recovery techniques suitable to VSB signals. For QAM signals, decision-directed carrier estimation techniques are described in Chapter 16 of *Digital Communication—Second Edition*, Lee and Messerschmitt, Kluwer Academic Publishers, Boston, Mass., 1997. See *Theory and Design of Adaptive Filters*, New York, John Wiley and Sons, 1987, by Treichler et al for a description of adaptive filters, including forward adaptive filtering and error term generation.

Forward processing block 330 receives input samples from front end signal processing blocks of the digital receiver, for example, as shown in FIG. 2. Forward processing block 330 also receives soft decision sample y(k) input to slicer 360, and also receives output of slicer 360. Forward processing block 330 further may provide output to slicer 360, for example to provide sine and cosine terms to slicer 360 if slicer 360 is to form passband samples, as described in "Carrier independent blind initialization of a DFE," by T. J. Endres et al., in *Proceedings of the IEEE Workshop on Signal Processing Advances in Wireless Communications*, Annapolis, Md., May 1999. Gain correction terms may also be supplied to slicer 360 from forward processing block 330; gain and phase correction terms are represented by $\beta(k) \cdot e^{j\theta(k)}$ in FIG. 3.

Adder 340 combines x(k) with feedback filter 370 output w(k) to provide sample y(k), referred to as the soft-decision sample; combining can either be done with addition or subtraction, depending upon other polarity choices made. Soft decision sample y(k) is provided to slicer 360. Slicer 360 produces a symbol estimate (also referred to as a hard decision sample). Slicer 360 can be a nearest-element decision device, selecting the source symbol with minimum Euclidean distance to the soft decision sample, or can take advantage of the channel coding. For example, a partial trellis decoder is used as slicer 360 in "A method of estimating trellis encoded symbols utilizing simplified trellis decoding," U.S. Pat. No. 6,178,209, issued Jan. 23, 2001, by S. N. Hulyalkar et al. Slicer 360 may also receive an input signal from forward processing block 330, for example, including sine and cosine terms which may be used for rotation and de-rotation in accordance with previously cited prior art techniques.

The output from slicer 360 is used to form regressor sample z(k) for feedback filter 370. Feedback filter 370 receives regressor samples z(k) and produces output sample w(k) to adder 340. Feedback filter 370 is usually implemented with adaptive coefficients, and is therefore provided error term e(k) for coefficient adjustment. Error term e(k) may be generated in forward processing block 330 or elsewhere in the receiver architecture. The adaptive filter contained in forward processing block 330 and feedback filter 370 may be comprised of real- or complex-valued coefficients, may process real- or complex-valued data, and may adjust coefficients or blocks of coefficients using real- or complex-valued error.

Figure 4:
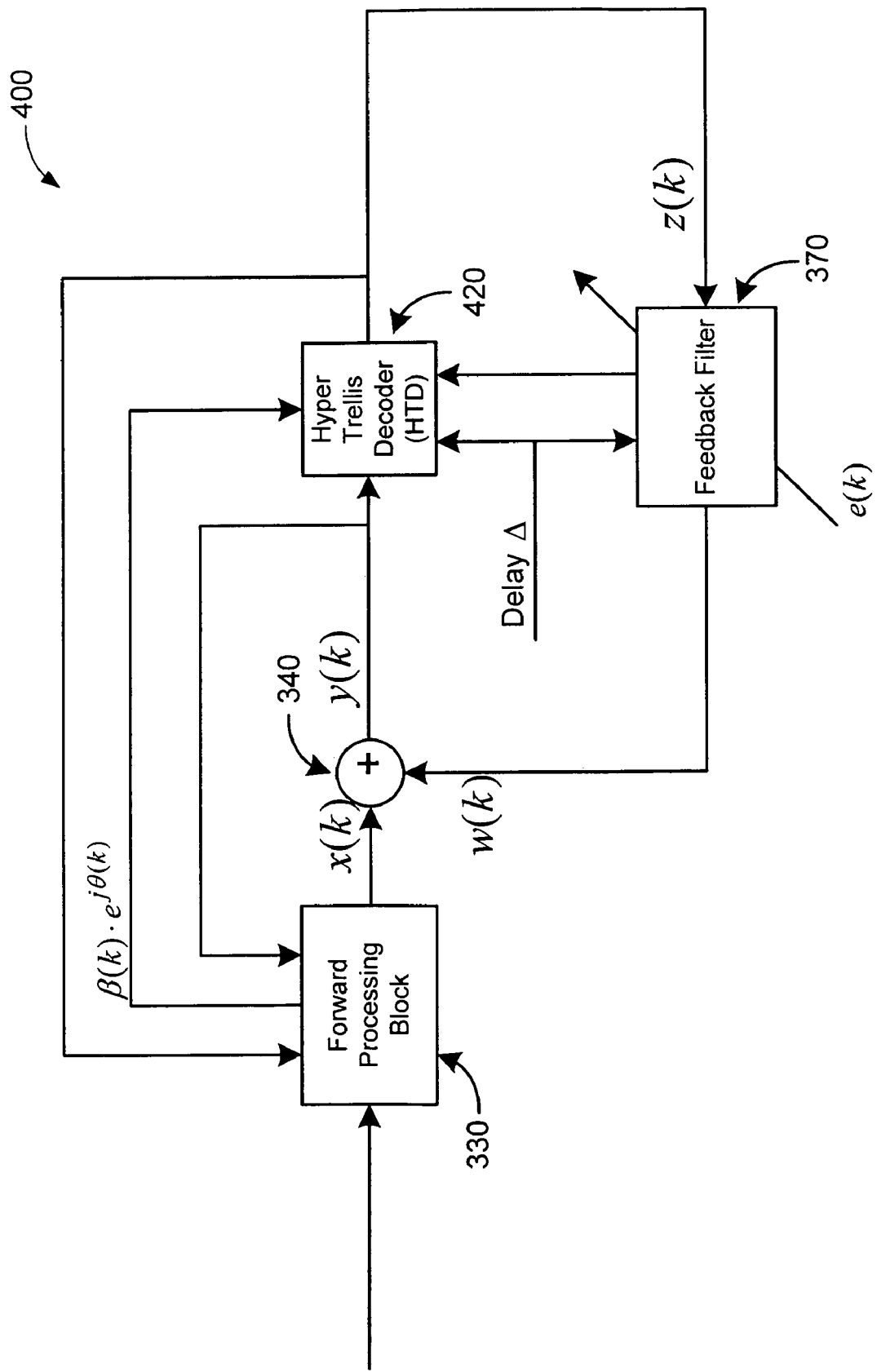
FIG. 4 shows equalizer circuitry in accordance with the present invention.

FIG. 4 shows equalizer circuitry in accordance with the present invention where hyper trellis decoder (HTD) 420 replaces slicer 360 from FIG. 3. Unlike slicer 360, hyper trellis decoder 420 receives an input from feedback filter 370 corresponding to the coefficient of the filter at delay Δ or some measure of the coefficient at delay Δ. The programmable delay Δ is provided to hyper trellis decoder 420 and feedback filter 370. Unlike slicer 360, and other prior art which uses input from feedback filter 370, hyper trellis decoder 420 uses maximum likelihood techniques to efficiently estimate non-contiguous symbols, separated by delay Δ, whereby the contribution of the symbol estimate at delay Δ is removed, and all possibilities are tested instead.

The symbol estimate produced by hyper trellis decoder 420 is more reliable than that of conventional prior art techniques, for example, slicer 360, and can be used to directly or indirectly produce input data to feedback filter 370. Furthermore, the symbol estimate produced by hyper trellis decoder 420 can be used for error term generation, for example, in forward filter processing block 330 or elsewhere, to adjust adaptive filters in equalizer circuitry 400. The symbol estimate produced by hyper trellis decoder 420 can also be used in carrier estimation techniques, for example the prior art previously cited. The symbol estimate produced in hyper trellis decoder 420 may be further rotated or translated in frequency, for example by sine and cosine terms provided by forward processing block 330, depending on the specifics of the architecture described in equalizer circuitry 400 or the signal protocol.

The programmable delay $\Delta$ provided to hyper trellis decoder 420 and feedback filter 370 can be static, or adjusted to optimize performance, according to some rule. For example, a measure of the coefficient magnitudes in feedback filter 370 can be used to select delay $\Delta$ throughout demodulator operation.

In the description of the present invention, for illustrative purposes, the trellis coding described is consistent with the ATSC standard, ATSC Digital Television Standard (A/53) Revision E. Furthermore, also shown is a trellis index, TrellisIndex, 0 . . . 11, accommodating the twelve interleaved trellis encoders in the ATSC standard. One skilled in the art would know how to modify the present invention to accommodate other trellis codes.

Figure 12:
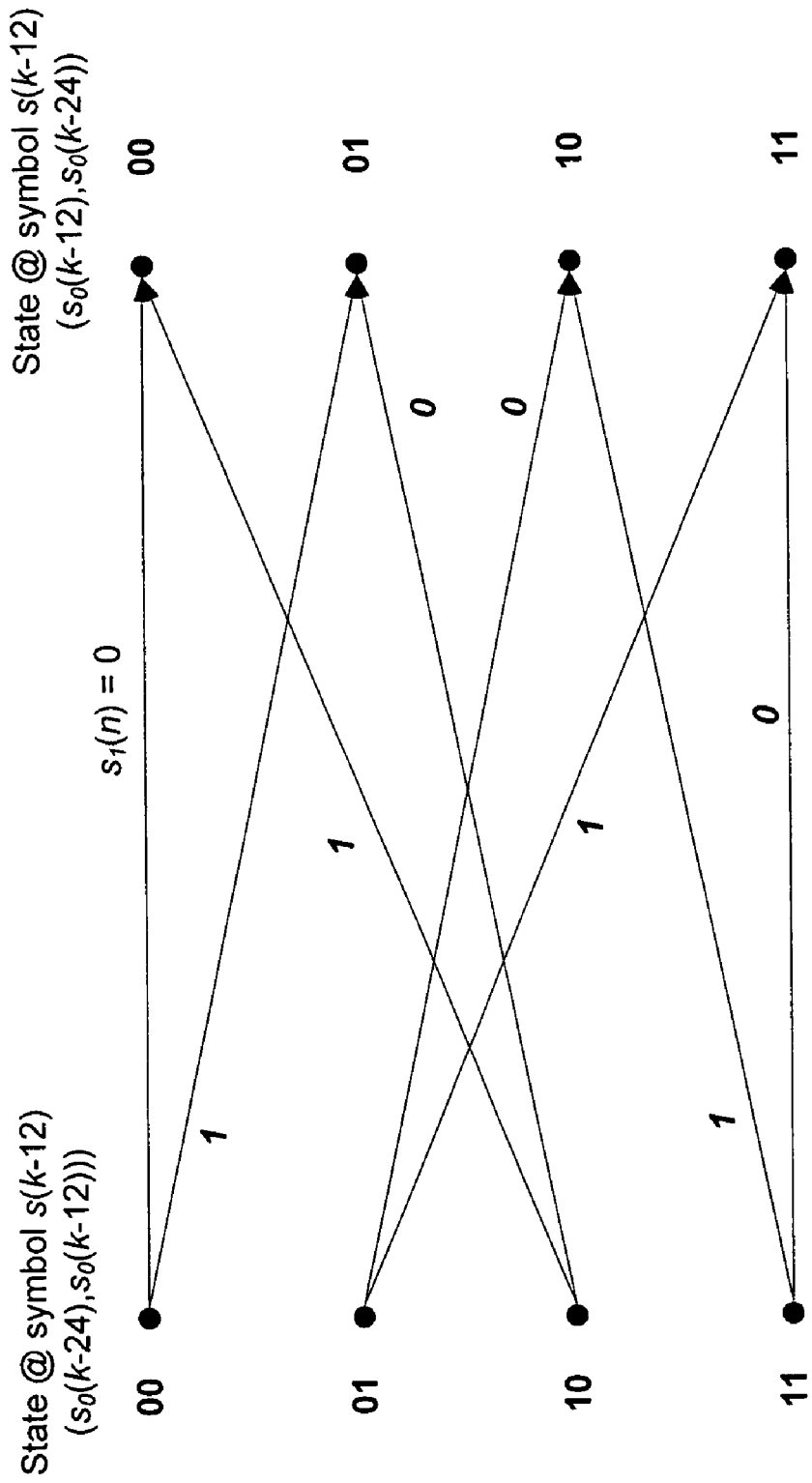
FIG. 12 shows trellis state transitions for a prior art ATSC trellis decoder.

Also for illustrative purposes, the description of the invention will focus on the particular two-dimensional case in which non-contiguous symbols $s(k)$ and $s(k-\Delta)$, $\Delta>0$, are jointly estimated. The invention extends the prior-art four state trellis in FIG. 12, which describes the possible paths taken by the states of each one of the twelve ATSC convolutional codes, to the "hypertrellis" in FIG. 13. The hypertrellis is defined by concatenating the states $S0=(s_0(k-12), s_0(k))$ and $S\Delta=(s_0(k-\Delta-12), s_0(k-\Delta))$ of the trellises at times k and k–$\Delta$ respectively, to form a sixteen state trellis. Note that $z_2$, $z_1$, $z_0$ are the bits formed by the ATSC convolutional code that are subsequently mapped to a symbol $s(k)$ from an eight-level alphabet $A=\{-7,-5,-3,-1,1,3,5,7\}$. Thus, in the two-dimensional case, the HTD is a viterbi decoder for the hypertrellis in FIG. 13, using the signals collected from the decision feedback equalizer structure in FIG. 4. One skilled in the art could extend the present invention to estimate more than two non-contiguous symbols such as $(s(k), s(k-\Delta_1), \ldots, s(k-\Delta_N))$.

Figure 13:
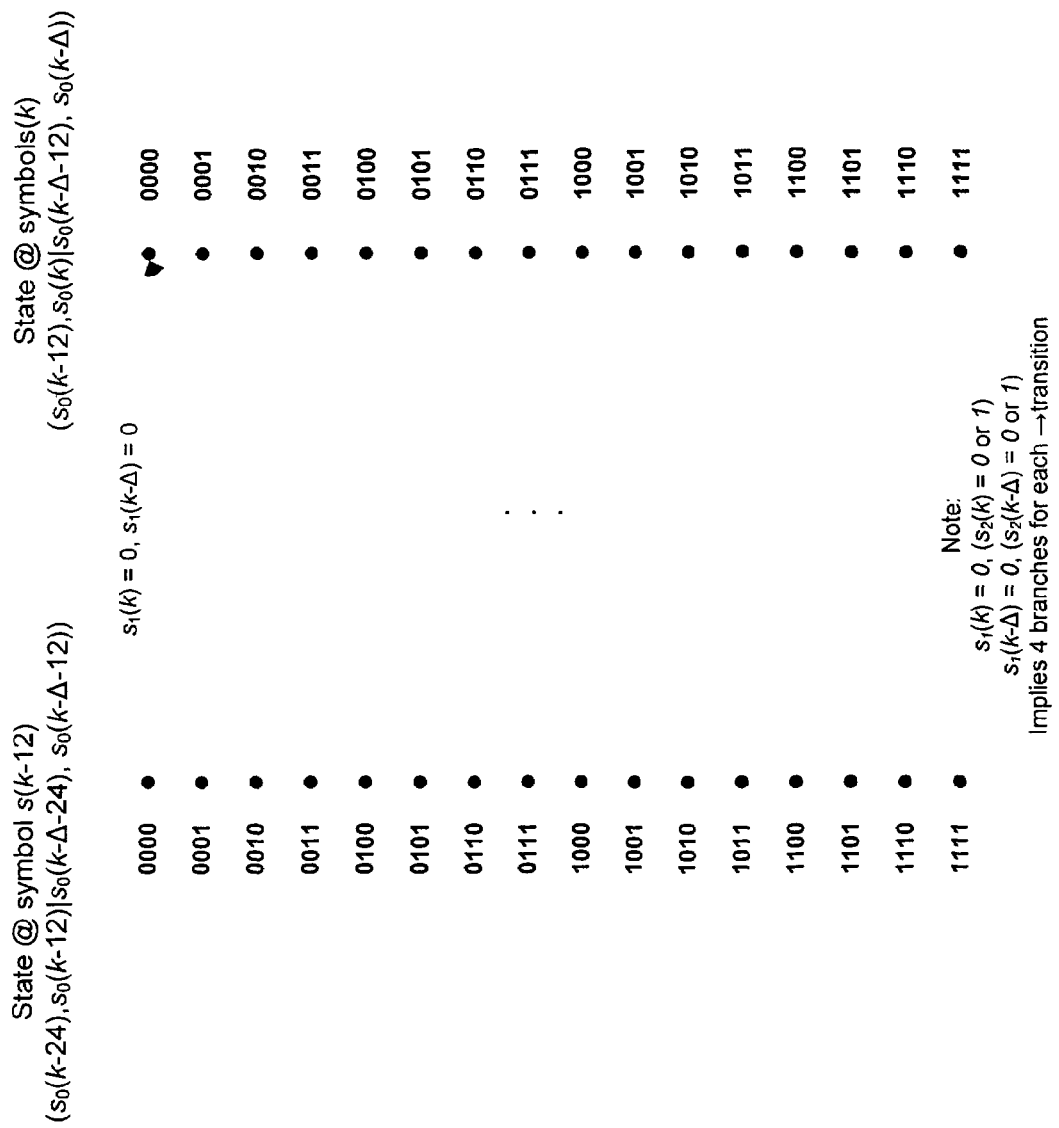
FIG. 13 shows trellis state transitions in accordance with the present invention.

In the two-dimensional case, the HTD generates branch metrics for the hypertrellis in FIG. 13 using the soft decision sample $y(k)$, calculated as $$y(k)=x(k)-[z(k-1)\cdot\alpha_1+z(k-2)\cdot\alpha_2+\ldots+z(k-N)\cdot\alpha_N]$$

where $z(k)$ are the estimates of symbols $s(k)$.

The HTD generates the observations $y(k)+z(k-\Delta)\cdot\alpha_\Delta$ and $y(k-\Delta)$ to estimate symbols $s(k)$ and $s(k-\Delta)$. To better understand how the HTD works, consider the case where past symbols are correct (i.e. $z(k-\delta)=s(k-\delta)$ for $\delta>0$) and $x(k)$ is well modeled as a linear combination of the transmitted symbol plus noise $u(k)$, i.e.

$$x(k)=s(k)+s(k-1)\cdot\alpha_1+s(k-2)\cdot\alpha_2+\ldots+s(k-N)\cdot\alpha_N+u(k).$$

Then, the observations generated by the HTD reduce to $$y(k)+z(k-\Delta)\cdot\alpha_\Delta=s(k)+s(k-\Delta)\cdot\alpha_\Delta+u(k)$$

$$y(k-\Delta)=s(k-\Delta)+u(k-\Delta)$$

Figure 5:
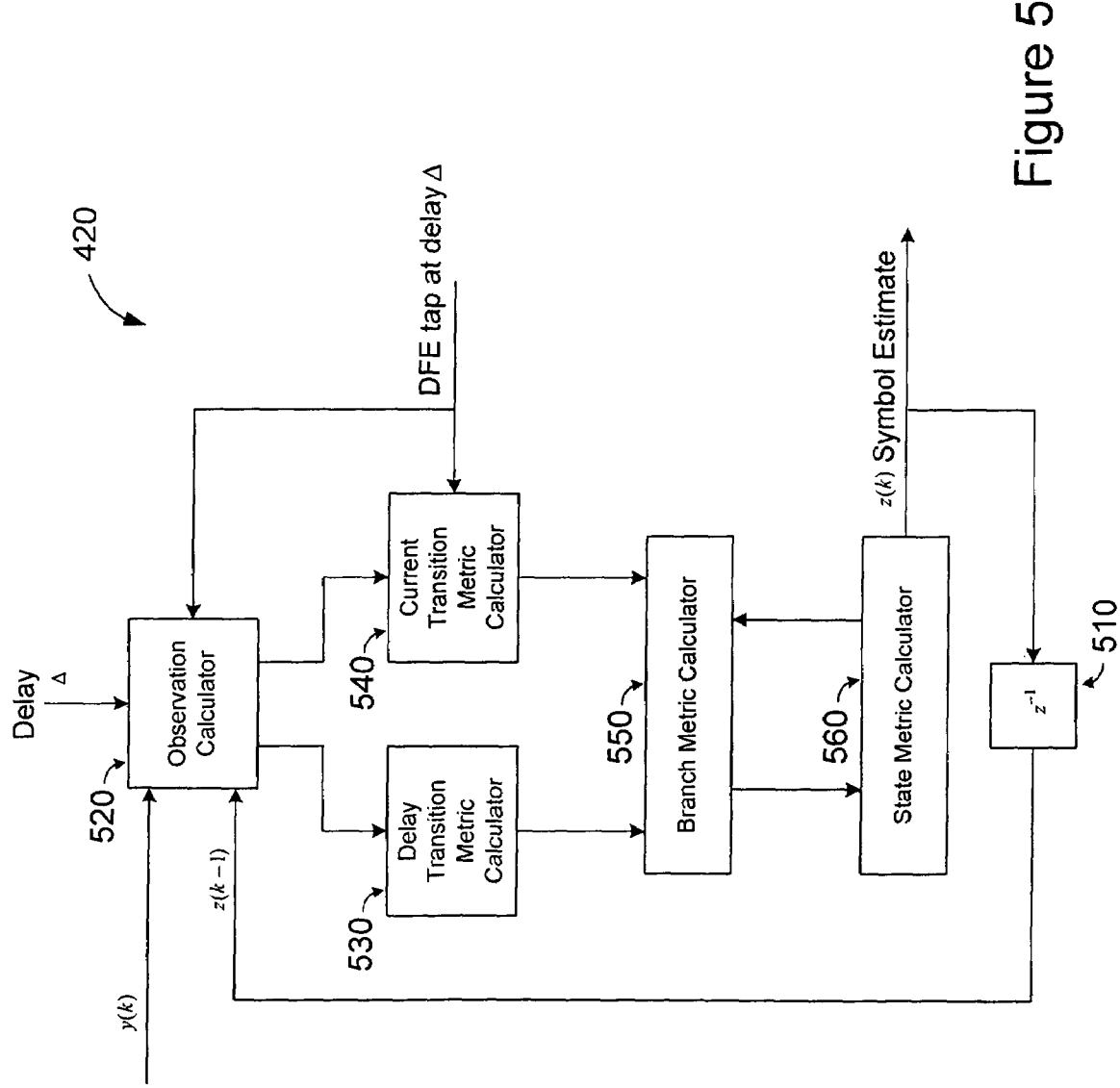
FIG. 5 shows a top level view of a hyper trellis decoder in accordance with the present invention.

Notice that these observations are linked by the delayed symbol $s(k-\Delta)$ and the coefficient $\alpha_{66}$. From these observations, the HTD generates the following branch metrics for the hypertrellis in FIG. 13

$$BM_{ij}=[y(k)+z(k-\Delta)\cdot\Delta_\Delta-a_i-a_j\cdot\alpha_\Delta]^2+[y(k-\Delta)-a_j]^2$$

where $a_{i,j}\in A$. These branch metrics are subsequently used to calculate path metrics of the trellis in FIG. 13. This process and its efficient implementation are next described. FIG. 5 shows a top level view of the hyper trellis decoder 420 in accordance with the present invention. Observation calculator 520 receives soft decision sample $y(k)$ from adder element 510. Observation calculator 520 also receives programmable input, delay $\Delta$, and from feedback filter 370, the coefficient of the filter at delay $\Delta$ or some measure of the coefficient at delay $\Delta$. Observation calculator 520 produces observations for the current transition metric calculator 540 and the delay transition metric calculator 530. Delay transition metric calculator 530 uses the observations from observation calculator 520 and the symbol alphabet to calculate an array of transition metrics corresponding to the delayed symbol estimate. Current transition metric calculator 540 uses the observations from observation calculator 520, programmable delay $\Delta$, and the symbol alphabet to calculate an array of transition metrics corresponding to the current symbol estimate. Branch metric calculator 550 uses the transition metrics from delay transition metric calculator 530 and current transition metric calculator 540, and state metrics from state metric calculator 560 to calculate an array of branch metrics and an array of branch symbols used in state metric calculator 560. State metric calculator 560 uses the array of branch metrics and array of branch symbols from branch metric calculator 550 to calculate symbol estimate $z(k)$, provided to delay element 510, and state metrics, provided to branch metric calculator 550, respectively. Delay element 510 delays symbol estimate $z(k)$ by one sample and provides previous symbol estimate $z(k-1)$ to observation calculator 520.

Figure 6:
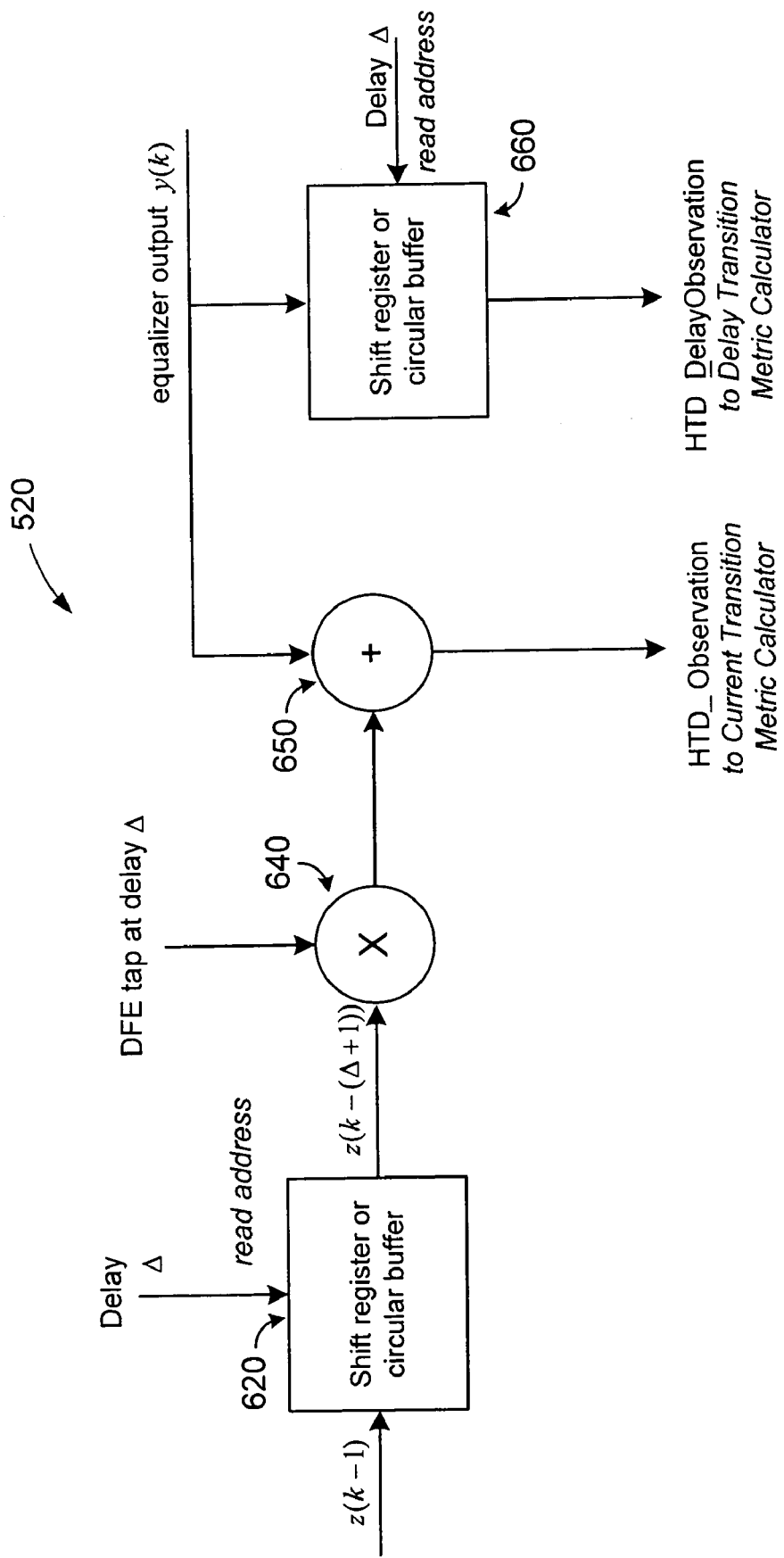
FIG. 6 shows an observation calculator in accordance with the present invention.

FIG. 6 shows observation calculator 520 in accordance with the present invention. Previous symbol estimate $z(k-1)$ from delay element 510, along with programmable delay $\Delta$, are provided to shift register/circular buffer 620. Shift register/circular buffer 620 reads the programmable delay $\Delta$ and produces the delayed symbol estimate $z(k-(\Delta+1))$ to multiplier 640. Multiplier 640 multiplies $z(k-(\Delta+1))$ from shift register/circular buffer 620 with the coefficient of the filter at delay $\Delta$ or some measure of the coefficient at delay $\Delta$ provided from feedback filter 370. The result of multiplier 640 is added to the soft decision sample $y(k)$ in adder 650 to form the observation for current transition metric calculator 540, HTD_Observation, which is expressed as $$HTD\_Observation=\alpha_{\Delta+1}(k)\cdot z(k-(\Delta+1))+y(k)$$

where $\alpha_{\Delta+1}(k)$ is the coefficient of the filter at delay $\Delta$ or some measure of the coefficient at delay $\Delta$ provided from feedback filter 370.

The observation for delay transition metric calculator 530, HTD_DelayObservation, is formed from shift register/circular buffer 660. Shift register/circular buffer 660 inputs soft decision sample $y(k)$, and by reading programmable delay $\Delta$, produces the observation for delay transition metric calculator 530, $$HTD\_DelayObservation=y(k-\Delta)$$

Figure 7:
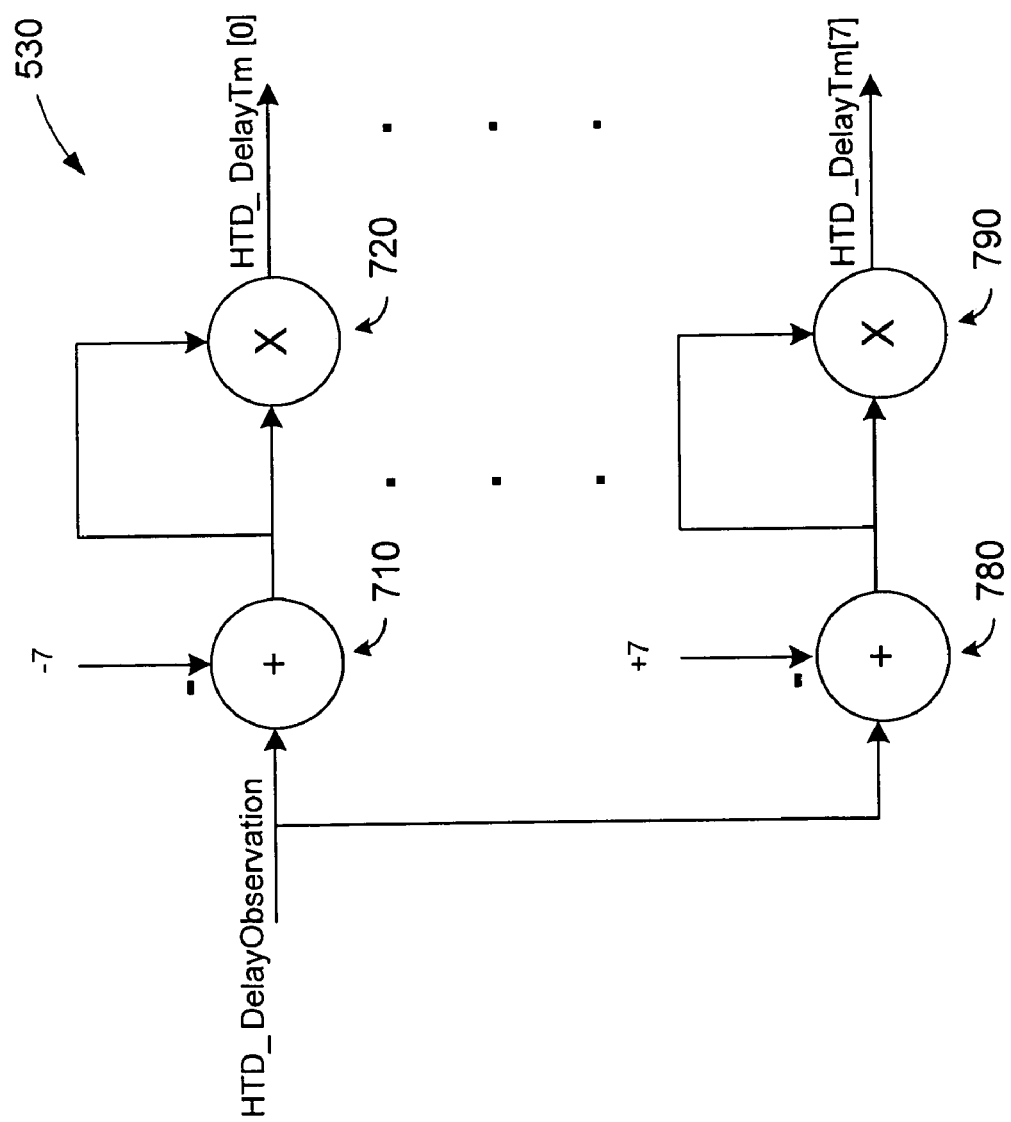
FIG. 7 shows a delay transition metric calculator in accordance with the present invention.

FIG. 7 shows delay transition metric calculator 530 in accordance with the present invention. The delay observation HTD_DelayObservation from observation calculator 520 is used as input to delay transition metric calculator 530, and for each member of the symbol alphabet, $a_i \in A$, the delay transition metric is calculated according to $$HTD\_DelayTm_i=HTD\_DelayObservation-a_i$$

Adders 710 . . . 780 each subtract a symbol value from delay observation HTD_DelayObservation. Here, the 8-level symbol alphabet $A=\{-7,-5,-3,-1,1,3,5,7\}$ is shown for simplicity. The outputs of adders 710 . . . 780 are each squared in multipliers 720 ... 790, producing the array of delay transition metrics, HTD_DelayTm[i], i=0 ... 7, for use in branch metric calculator 550.

Figure 8:
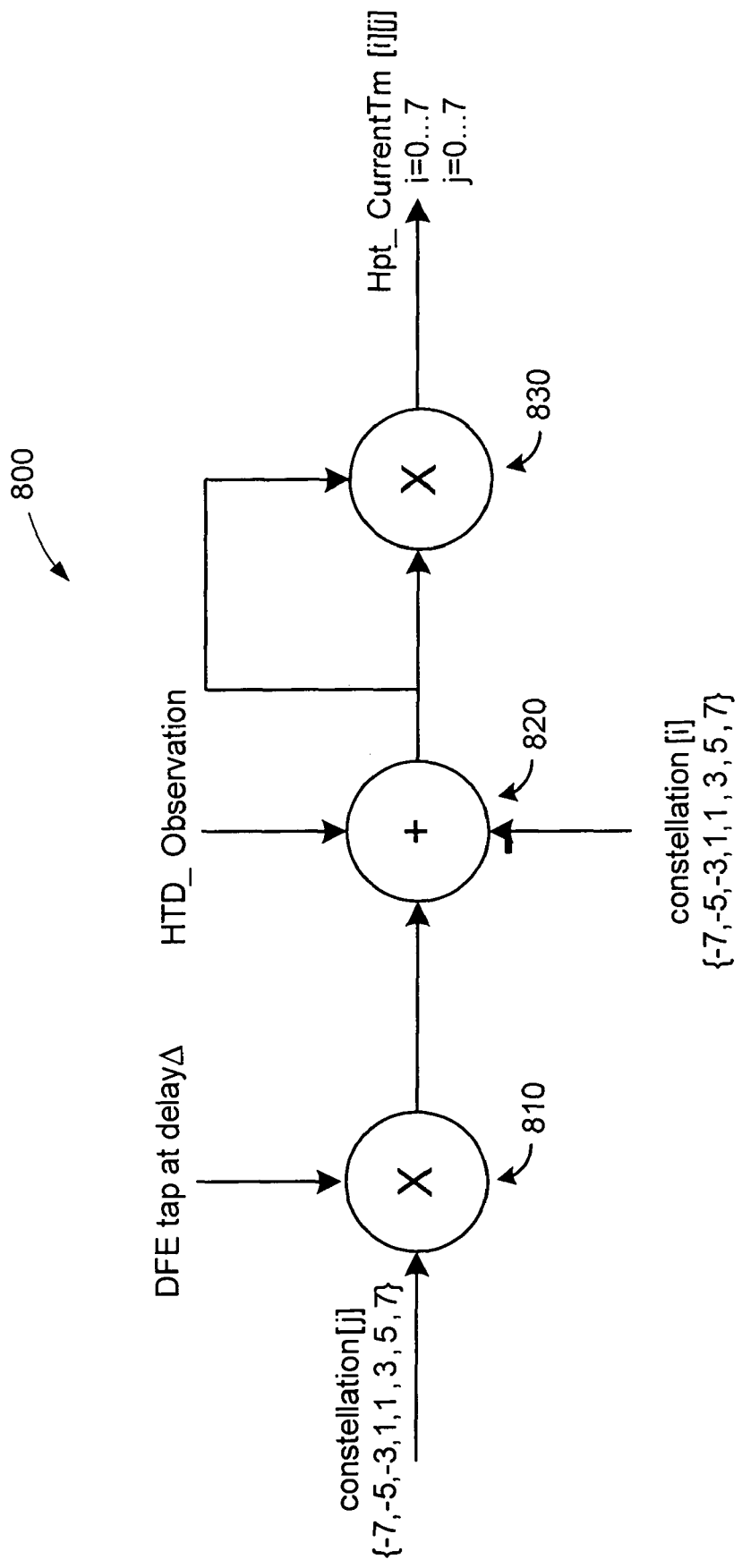
FIG. 8 shows a current transition metric calculator in accordance with the present invention.

FIG. 8 shows current transition metric calculator 540 in accordance with the present invention. Current transition metric calculator 540 uses HTD_Observation from observation calculator 520, and from feedback filter 370, the coefficient of the filter at delay $\Delta$ or some measure of the coefficient at delay $\Delta$, to calculate an array of current transition metrics, HTD_CurrentTm[i][j], according to $$HTD\_CurrentTm[i][j]=(HTD\_Observation+ a_j \cdot \alpha_{\Delta+1}(k) - a_i)^2$$

with i=0 ... 7, j=0 ... 7, continuing again with the 8-level symbol alphabet A={-7,-5,-3,-1,1,3,5,7} for simplicity. Observe that the current transition metrics are calculated using all possible combinations of alphabet members.

Multiplier 810 multiplies alphabet member $a_j$, j=0 ... 7 with the coefficient of the filter at delay $\Delta$, or some measure of the coefficient at delay $\Delta$, from feedback filter 370. Adder 820 sums the output of multiplier 810 with HTD_Observation from observation calculator 520 and subtracts alphabet member $a_i$, i=0 ... 7 from the result, which is squared in multiplier 830 to form the array of current transition metrics, HTD_CurrentTm[i][j].

Figure 9:
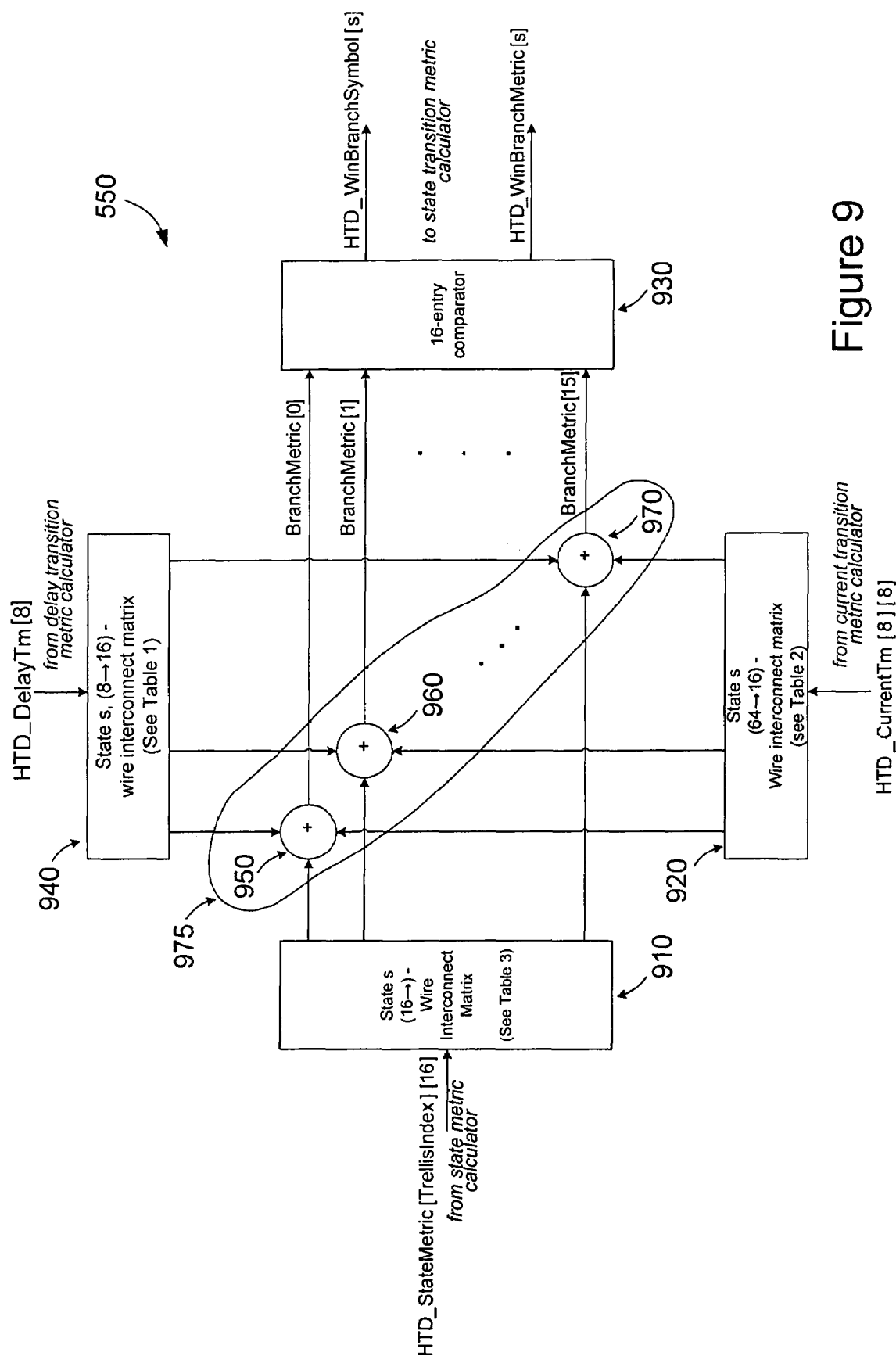
FIG. 9 shows a branch metric calculator in accordance with the present invention.

FIG. 9 shows branch metric calculator 550 in accordance with the present invention. Branch metric calculator 550 calculates all the branch metrics associated with the hypertrellis. In the two-dimensional case represented by the hypertrellis in FIG. 13, for example, each new state results in incoming transitions from four previous states. Each transition is a result of changes in four different bits (i.e. two bits from each four-state trellis in FIG. 12), implying four possible branches. Thus, the total number of incoming branches for each new state is sixteen, for a total of 256 branches given sixteen separate code states. The branch metrics can be assembled efficiently by combining the previously calculated and stored delayed and current transition metrics from calculators 530 and 540, respectively. Furthermore, path metrics for the trellis can also be calculated by adding the path metrics for each previous state to each of the branch metrics. For the purpose of simplicity, the combination of previous path metrics (i.e. HTD_StateMetrics) and transition metrics (i.e. HTD_CurrentTm and HTD_DelayTm) will be called the "branch metrics" (i.e. BranchMetric).

The stored metrics HTD_StateMetrics, HTD_CurrentTm, and HTD_DelayTm in branch metric calculator 550 are combined via wire interconnect matrices 910, 920 and 940. Specifics of the wire interconnect matrices 910, 920, and 940 depend on the trellis encoder used in the signal protocol. The tables describing the specifics of the wire interconnect matrices 910, 920, and 940 will be those for the ATSC signal format used for DTV signals in the U.S., as described in ATSC Digital Television Standard (A/53) Revision E. Furthermore, also shown here is a trellis index, TrellisIndex, 0 ... 11, accommodating the twelve interleaved trellis encoders in the ATSC standard. One skilled in the art would know how to produce wire interconnect tables for other trellis encoders, and modify the present invention to accommodate un-encoded data, for example, possibly from a training sequence.

Wire interconnect matrix 910 is a 16-to-16 mapping of input to output, mapping the length-16 input array HTD_StateMetric[TrellisIndex][16] from state transition metric calculator 560 to its 16 output terminals, depending on the state S of the trellis decoder. There are twelve interleaved encoders used in the ATSC standard, and the TrellisIndex, 0 ... 11, is used to denote this nuance. For ATSC-encoded signals, the specific mapping is described in Table 3. The elements in the table are the indices of elements of HTD_StateMetric, and the column index is the output terminal of wire interconnect matrix 910.

Wire interconnect matrix 940 is an 8-to-16 mapping of input to output, mapping the length-8 input array HTD_DelayTm[8] from delay transition metric calculator 530 to its 16 output terminals, depending on the state S of the trellis decoder. For ATSC-encoded signals, the specific mapping is described in Table 1. The elements in the table are the indices of elements of HTD_DelayTm, and the column index is the output terminal of wire interconnect matrix 940.

Wire interconnect matrix 920 is a 64-to-16 mapping of input to output, mapping the 8×8 input array HTD_CurrentTm[8][8] from current transition metric calculator 540 to its 16 output terminals, depending on the state S of the trellis decoder. For ATSC-encoded signals, the specific mapping is described in Table 2. The elements in the table are the indices (i,j) of elements of HTD_CurrentTm[i][j], and the column index is the output terminal of wire interconnect matrix 920.

The sixteen outputs of wire interconnect matrices 910, 920, and 940 are summed in the adder array 975, containing sixteen adders for ATSC, adder 950, adder 960, ... adder 970. Adder 950 sums the $0^{th}$ output terminals of wire interconnect matrices 910, 920, and 940 and produces BranchMetric[0]; adder 960 sums the $1^{st}$ output terminals of wire interconnect matrices 910, 920, and 940 and produces BranchMetric[1]; ... adder 970 sums the $15^{th}$ output terminals of wire interconnect matrices 910, 920, and 940 and produces BranchMetric[15]. The branch metric array BranchMetric[i], i=0 ... 15, is provided to comparator 930.

For each state S=0 ... 15 of the decoder, comparator 930 compares the array of branch metrics, and assigns the lowest branch metric among the array BranchMetric[i] to the $S^{th}$ position of output array HTD_WinBranchMetric[s]. Furthermore, comparator 930 assigns the alphabet member associated with the lowest branch metric to the $S^{th}$ h position of output array HTD_WinBranchSymbol[s].

Figure 10:
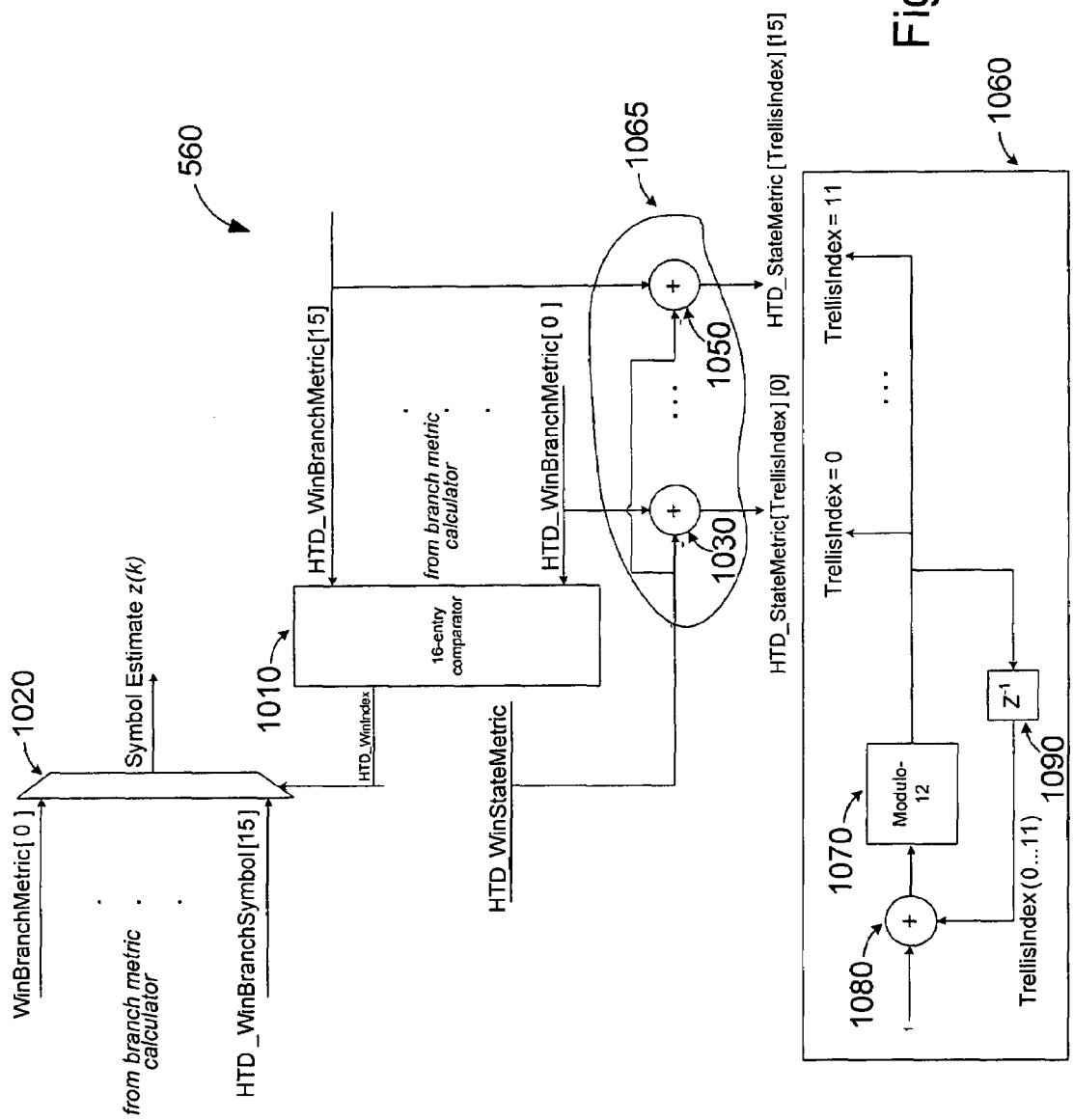
FIG. 10 shows a state transition metric calculator in accordance with the present invention.

FIG. 10 shows state transition metric calculator 560 in accordance with the present invention. Comparator 1010 receives the array of winning branch metrics, HTD_WinBranchMetric[s], S=0 ... 15, from branch metric calculator 550. Comparator 1010 selects the index of the array corresponding to the lowest element of the array, assigns it to HTD_WinIndex, and assigns the lowest element itself to HTD_WinStateMetric. Multiplexer 1020 receives the array of winning branch symbols, HTD_WinBranchSymbol[s], S=0 ... 15, from branch metric calculator 550 and assigns the element of HTD_WinBranchSymbols[s] to symbol estimate z(k) according to the value of HPT_WinIndex provided from comparator 1010. The estimate z(k) for s(k) is fed back into observation calculator 520 and decision feedback filter 370. Note that the HTD decoding process also yields a new estimate z(k–$\Delta$) for s(k–$\Delta$) which can be used to replace the previous estimate in the decision feedback filter.

The winning state metric HTD_WinStateMetric from comparator 1010 is subtracted from each element of array HTD_WinBranchMetric[s], S=0 ... 15, in adder array 1065, which includes exemplary adders 1030 ... 1050, to form the array of state metrics, HTD_StateMetric[TrellisIndex][s], S=0 ... 15, which are used in branch metric calculator 550. This is an implementation specific technique used to normalize the accumulated metrics. Other normalization techniques can be applied by someone skilled in the art.

The trellis index circuitry 1060 reflects the ATSC DTV standard and is used to generate the trellis index, TrellisIndex=0, ... 11. Adder 1080 increments by one the contents of register 1090, and the result is constrained to 0 . . . 11 using modulo-12 arithmetic in modulo-12 block 1070. The result TrellisIndex is used for the twelve interleaved trellis encoders in the ATSC standard.

Figure 11:
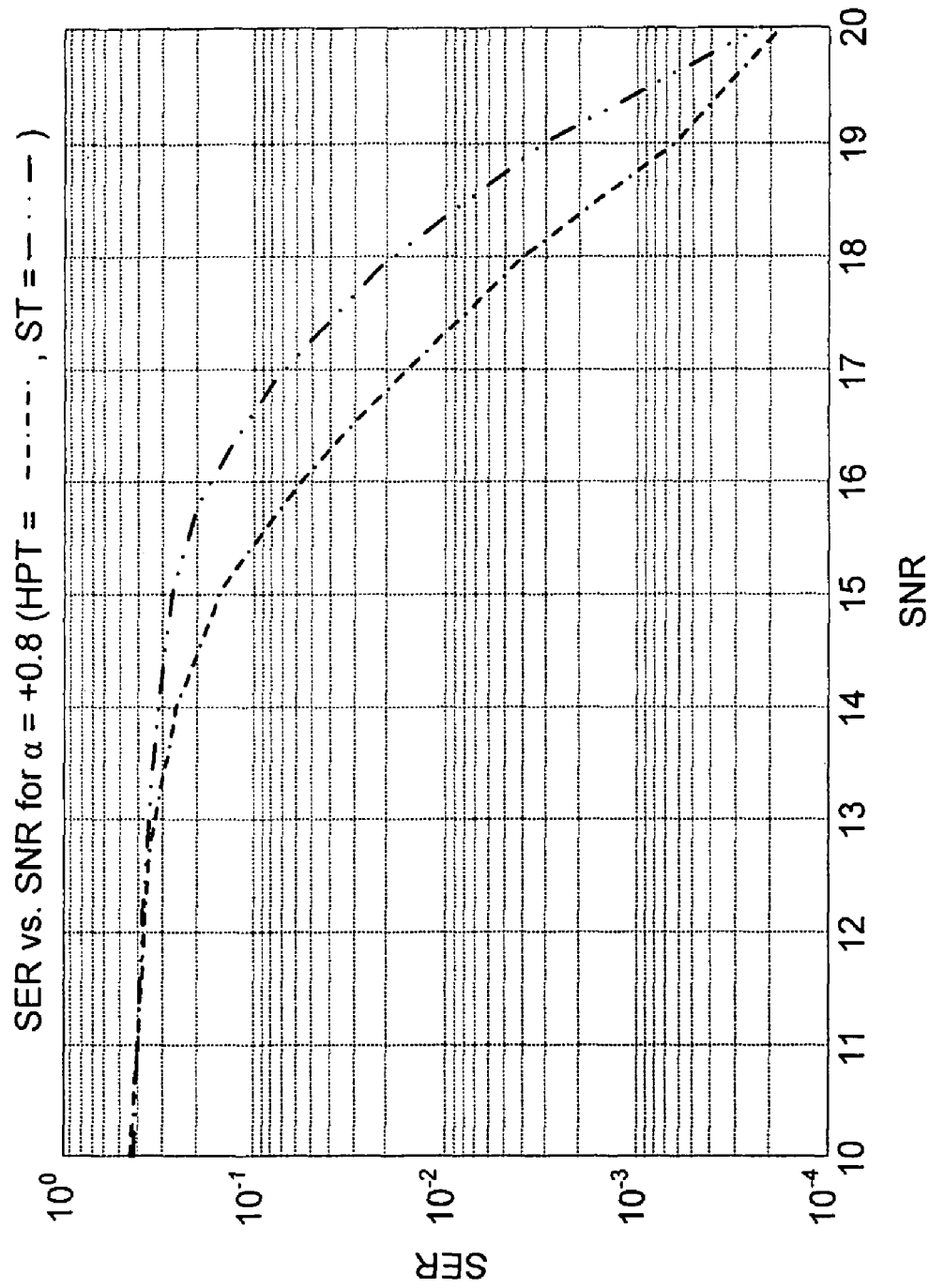
FIG. 11 shows symbol error rate versus signal to noise ratio results comparing prior art with the present invention.

FIG. 11 shows symbol error rate (SER) versus signal-to-noise ratio (SNR) simulation results for 8-level signaling illustrating the benefits of the present invention. A conventional, prior art trellis decoder and the hyper trellis decoder are compared, with a single echo channel model, $1+\alpha \cdot z^{-\Delta}$. The operating point for 8-level signaling according to ATSC corresponding to threshold of visibility is approximately a SER of 20%. At this error rate, the present invention shows a full dB of improvement in required SNR, from about 18.3 dB to about 17.3 dB, which is significant in terms of coverage area of the DTV broadcast.

One skilled in the art would understand that the equations described herein may include scaling, change of sign, or similar constant modifications that are not shown for simplicity. One skilled in the art would realize that such modifications can be readily determined or derived for the particular implementation. Thus, the described equations may be subject to such modifications, and are not limited to the exact forms presented herein.

As would be apparent to one skilled in the art, the various functions of equalization, signal combining, error correction, and carrier recovery may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

TABLE 1

Delay-Transition-Matrix Cell Address

| State | S0 | SΔ | \|\|\|\|\|\|\|\|\|\|\|\|\|\|\|\| Branch |||||||||||||||| |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| 0 | 0 | 0 | 0 | 2 | 4 | 6 | 0 | 2 | 4 | 6 | 0 | 2 | 4 | 6 | 0 | 2 | 4 | 6 |
| 1 | 0 | 1 | 2 | 0 | 4 | 6 | 2 | 0 | 4 | 6 | 2 | 0 | 4 | 6 | 2 | 0 | 4 | 6 |
| 2 | 0 | 2 | 1 | 3 | 5 | 7 | 1 | 3 | 5 | 7 | 1 | 3 | 5 | 7 | 1 | 3 | 5 | 7 |
| 3 | 0 | 3 | 3 | 1 | 5 | 7 | 3 | 1 | 5 | 7 | 3 | 1 | 5 | 7 | 3 | 1 | 5 | 7 |
| 4 | 1 | 0 | 0 | 2 | 4 | 6 | 0 | 2 | 4 | 6 | 0 | 2 | 4 | 6 | 0 | 2 | 4 | 6 |
| 5 | 1 | 1 | 2 | 0 | 4 | 6 | 2 | 0 | 4 | 6 | 2 | 0 | 4 | 6 | 2 | 0 | 4 | 6 |
| 6 | 1 | 2 | 1 | 3 | 5 | 7 | 1 | 3 | 5 | 7 | 1 | 3 | 5 | 7 | 1 | 3 | 5 | 7 |
| 7 | 1 | 3 | 3 | 1 | 5 | 7 | 3 | 1 | 5 | 7 | 3 | 1 | 5 | 7 | 3 | 1 | 5 | 7 |
| 8 | 2 | 0 | 0 | 2 | 4 | 6 | 0 | 2 | 4 | 6 | 0 | 2 | 4 | 6 | 0 | 2 | 4 | 6 |
| 9 | 2 | 1 | 2 | 0 | 4 | 6 | 2 | 0 | 4 | 6 | 2 | 0 | 4 | 6 | 2 | 0 | 4 | 6 |
| 10 | 2 | 2 | 1 | 3 | 5 | 7 | 1 | 3 | 5 | 7 | 1 | 3 | 5 | 7 | 1 | 3 | 5 | 7 |
| 11 | 2 | 3 | 3 | 1 | 5 | 7 | 3 | 1 | 5 | 7 | 3 | 1 | 5 | 7 | 3 | 1 | 5 | 7 |
| 12 | 3 | 0 | 0 | 2 | 4 | 6 | 0 | 2 | 4 | 6 | 0 | 2 | 4 | 6 | 0 | 2 | 4 | 6 |
| 13 | 3 | 1 | 2 | 0 | 4 | 6 | 2 | 0 | 4 | 6 | 2 | 0 | 4 | 6 | 2 | 0 | 4 | 6 |
| 14 | 3 | 2 | 1 | 3 | 5 | 7 | 1 | 3 | 5 | 7 | 1 | 3 | 5 | 7 | 1 | 3 | 5 | 7 |
| 15 | 3 | 3 | 3 | 1 | 5 | 7 | 3 | 1 | 5 | 7 | 3 | 1 | 5 | 7 | 3 | 1 | 5 | 7 |

TABLE 2

Current-Transition-Matrix Cell Address Pairs (Current, Delayed)

| State | S0 | SΔ | Branch |||||||||||||||| |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| 0 | 0 | 0 | (0,0) | (0,2) | (0,4) | (0,6) | (2,0) | (2,2) | (2,4) | (2,6) | (4,0) | (4,2) | (4,4) | (4,6) | (6,0) | (6,2) | (6,4) | (6,6) |
| 1 | 0 | 1 | (0,2) | (0,0) | (0,4) | (0,6) | (2,2) | (2,0) | (2,4) | (2,6) | (4,2) | (4,0) | (4,4) | (4,6) | (6,2) | (6,0) | (6,4) | (6,6) |
| 2 | 0 | 2 | (0,1) | (0,3) | (0,5) | (0,7) | (2,1) | (2,3) | (2,5) | (2,7) | (4,1) | (4,3) | (4,5) | (4,7) | (6,1) | (6,3) | (6,5) | (6,7) |
| 3 | 0 | 3 | (0,3) | (0,1) | (0,5) | (0,7) | (2,3) | (2,1) | (2,5) | (2,7) | (4,3) | (4,1) | (4,5) | (4,7) | (6,3) | (6,1) | (6,5) | (6,7) |
| 4 | 1 | 0 | (2,0) | (2,2) | (2,4) | (2,6) | (0,0) | (0,2) | (0,4) | (0,6) | (4,0) | (4,2) | (4,4) | (4,6) | (6,0) | (6,2) | (6,4) | (6,6) |
| 5 | 1 | 1 | (2,2) | (2,0) | (2,4) | (2,6) | (0,2) | (0,0) | (0,4) | (0,6) | (4,2) | (4,0) | (4,4) | (4,6) | (6,2) | (6,0) | (6,4) | (6,6) |
| 6 | 1 | 2 | (2,1) | (2,3) | (2,5) | (2,7) | (0,1) | (0,3) | (0,5) | (0,7) | (4,1) | (4,3) | (4,5) | (4,7) | (6,1) | (6,3) | (6,5) | (6,7) |
| 7 | 1 | 3 | (2,3) | (2,1) | (2,5) | (2,7) | (0,3) | (0,1) | (0,5) | (0,7) | (4,3) | (4,1) | (4,5) | (4,7) | (6,3) | (6,1) | (6,5) | (6,7) |
| 8 | 2 | 0 | (1,0) | (1,2) | (1,4) | (1,6) | (3,0) | (3,2) | (3,4) | (3,6) | (5,0) | (5,2) | (5,4) | (5,6) | (7,0) | (7,2) | (7,4) | (7,6) |
| 9 | 2 | 1 | (1,2) | (1,0) | (1,4) | (1,6) | (3,2) | (3,0) | (3,4) | (3,6) | (5,2) | (5,0) | (5,4) | (5,6) | (7,2) | (7,0) | (7,4) | (7,6) |
| 10 | 2 | 2 | (1,1) | (1,3) | (1,5) | (1,7) | (3,1) | (3,3) | (3,5) | (3,7) | (5,1) | (5,3) | (5,5) | (5,7) | (7,1) | (7,3) | (7,5) | (7,7) |

TABLE 2-continued

Current-Transition-Matrix Cell Address Pairs (Current, Delayed)

| State | S0 | SΔ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 11 | 2 | 3 | (1, 3) | (1, 1) | (1, 5) | (1, 7) | (3, 3) | (3, 1) | (3, 5) | (3, 7) | (5, 3) | (5, 1) | (5, 5) | (5, 7) | (7, 3) | (7, 1) | (7, 5) | (7, 7) |
| 12 | 3 | 0 | (3, 0) | (3, 2) | (3, 4) | (3, 6) | (1, 0) | (1, 2) | (1, 4) | (1, 6) | (5, 0) | (5, 2) | (5, 4) | (5, 6) | (7, 0) | (7, 2) | (7, 4) | (7, 6) |
| 13 | 3 | 1 | (3, 2) | (3, 0) | (3, 4) | (3, 6) | (1, 2) | (1, 0) | (1, 4) | (1, 6) | (5, 2) | (5, 0) | (5, 4) | (5, 6) | (7, 2) | (7, 0) | (7, 4) | (7, 6) |
| 14 | 3 | 2 | (3, 1) | (3, 3) | (3, 5) | (3, 7) | (1, 1) | (1, 3) | (1, 5) | (1, 7) | (5, 1) | (5, 3) | (5, 5) | (5, 7) | (7, 1) | (7, 3) | (7, 5) | (7, 7) |
| 15 | 3 | 3 | (3, 3) | (3, 1) | (3, 5) | (3, 7) | (1, 3) | (1, 1) | (1, 5) | (1, 7) | (5, 3) | (5, 1) | (5, 5) | (5, 7) | (7, 3) | (7, 1) | (7, 5) | (7, 7) |

TABLE 3

Past State Metrics

| State | S0 | SΔ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 0 | 0 | 0 | 0 | 2 | 0 | 2 | 8 | 10 | 8 | 10 | 0 | 2 | 0 | 2 | 8 | 10 | 8 | 10 |
| 1 | 0 | 1 | 0 | 2 | 2 | 0 | 8 | 10 | 10 | 8 | 0 | 2 | 2 | 0 | 8 | 10 | 10 | 8 |
| 2 | 0 | 2 | 1 | 3 | 1 | 3 | 9 | 11 | 9 | 11 | 1 | 3 | 1 | 3 | 9 | 11 | 9 | 11 |
| 3 | 0 | 3 | 1 | 3 | 3 | 1 | 9 | 11 | 11 | 9 | 1 | 3 | 3 | 1 | 9 | 11 | 11 | 9 |
| 4 | 1 | 0 | 0 | 2 | 0 | 2 | 8 | 10 | 8 | 10 | 8 | 10 | 8 | 10 | 0 | 2 | 0 | 2 |
| 5 | 1 | 1 | 0 | 2 | 2 | 0 | 8 | 10 | 10 | 8 | 8 | 10 | 10 | 8 | 0 | 2 | 2 | 0 |
| 6 | 1 | 2 | 1 | 3 | 1 | 3 | 9 | 11 | 9 | 11 | 9 | 11 | 9 | 11 | 1 | 3 | 1 | 3 |
| 7 | 1 | 3 | 1 | 3 | 3 | 1 | 9 | 11 | 11 | 9 | 9 | 11 | 11 | 9 | 1 | 3 | 3 | 1 |
| 8 | 2 | 0 | 4 | 6 | 4 | 6 | 12 | 14 | 12 | 14 | 4 | 6 | 4 | 6 | 12 | 14 | 12 | 14 |
| 9 | 2 | 1 | 4 | 6 | 6 | 4 | 12 | 14 | 14 | 12 | 4 | 6 | 6 | 4 | 12 | 14 | 14 | 12 |
| 10 | 2 | 2 | 5 | 7 | 5 | 7 | 13 | 15 | 13 | 15 | 5 | 7 | 5 | 7 | 13 | 15 | 13 | 15 |
| 11 | 2 | 3 | 5 | 7 | 7 | 5 | 13 | 15 | 15 | 13 | 5 | 7 | 7 | 5 | 13 | 15 | 15 | 13 |
| 12 | 3 | 0 | 4 | 6 | 4 | 6 | 12 | 14 | 12 | 14 | 12 | 14 | 12 | 14 | 4 | 6 | 4 | 6 |
| 13 | 3 | 1 | 4 | 6 | 6 | 4 | 12 | 14 | 14 | 12 | 12 | 14 | 14 | 12 | 4 | 6 | 6 | 4 |
| 14 | 3 | 2 | 5 | 7 | 5 | 7 | 13 | 15 | 13 | 15 | 13 | 15 | 13 | 15 | 5 | 7 | 5 | 7 |
| 15 | 3 | 3 | 5 | 7 | 7 | 5 | 13 | 15 | 15 | 13 | 13 | 15 | 15 | 13 | 5 | 7 | 7 | 5 |

What is claimed is:

1. A method for estimating symbol values in a communications receiver having a decision feedback equalizer, the decision feedback equalizer including filter and symbol estimation circuitry, the method comprising:
   in the symbol estimation circuitry
      coupling at least one coefficient of the filter to the filter and symbol estimation circuitry;
   calculating a current observation sample using output from the decision feedback equalizer and a coefficient of the filter;
   calculating a delayed observation sample using the output from the decision feedback equalizer;
   calculating current trellis transition metrics from a current observation sample and the coefficient of the filter;
   calculating delayed trellis transition metrics from a delayed observation sample;
   combining the current trellis transition metrics and the delayed trellis transition metrics with trellis state transition metrics to form trellis branch metrics and trellis branch symbols; and
   selecting a symbol estimate from said trellis branch symbols and the trellis state metrics from among the trellis branch metrics.

* * * * *